United States Patent [19]

Kalman

[11] Patent Number: 4,683,632
[45] Date of Patent: Aug. 4, 1987

[54] TRACK SUPPORT FOR SUPPORTING A FLEXIBLE TRACK

[75] Inventor: Peter Kalman, Pekin, Ill.

[73] Assignee: Caterpillar Inc., Peoria, Ill.

[21] Appl. No.: 773,703

[22] Filed: Sep. 9, 1985

[51] Int. Cl.⁴ .............................................. B23P 19/04
[52] U.S. Cl. .................................................. 29/281.1
[58] Field of Search ................... 29/281.1, 281.6, 283, 29/426.5, 148.3; 72/392; 254/100, 93 R

[56] References Cited

U.S. PATENT DOCUMENTS

| | | | |
|---|---|---|---|
| 44,417 | 9/1864 | Gleason | 72/392 |
| 724,037 | 3/1903 | Partington | 254/100 |
| 2,541,080 | 2/1951 | Lyon | 72/392 |
| 2,615,678 | 10/1952 | Stent | 254/100 |
| 4,050,141 | 9/1977 | Vanlandingham et al. | 29/426.5 |
| 4,258,463 | 3/1981 | Lindquist | 29/281.6 |
| 4,283,828 | 8/1981 | Cole | 254/100 |

*Primary Examiner*—Robert C. Watson
*Attorney, Agent, or Firm*—Sterling R. Booth, Jr.

[57] ABSTRACT

A track support for supporting a flexible continuous loop track when it is being removed or installed on a vehicle. Removing or installing the continuous loop flexible track by conventional methods is very difficult because of its weight and flexibility. The subject apparatus includes a track support having first and second ends with curved plates approximately the shape of semi-circular ends of the track loop where it engages wheels on a vehicle. The first and second ends are supported by at least one beam attached thereto in a manner to adjustably set the track support snug with the flexible track loop. Several retainers with hooks and fasteners secure the track to the support. Thereby the flexible track is held in an oval shape when being removed or installed on the vehicle similar to the shape it is when on the vehicle.

7 Claims, 5 Drawing Figures

TRACK SUPPORT FOR SUPPORTING A FLEXIBLE TRACK

TECHNICAL FIELD

This invention relates to a track support for supporting a flexible continuous loop track when it is being removed or installed on a vehicle for service of either the track or the vehicle.

BACKGROUND ART

A new undercarriage system developed by assignee of this application utilizes a cable reinforced rubber track. The track is used on the vehicle in one continuous loop. It is trained around a set of dual wheels near each end of the vehicle and includes an integral guide which runs between the dual wheels. To remove the track, the outer wheel of each dual set is removed.

Prior to the present invention, the track was then pulled off the remaining wheels by another vehicle and when the track cleared the wheels it would collapse on the ground. Since the track weighs approximately 450 kg, it is very difficult to handle in this condition. To replace the track it was placed alongside the wheels and one end of the loop of the track was raised by another vehicle while the track was forced over the inside wheel of one set of the duals. The opposite end was likewise raised and pried over the other inside wheel of the duals at the other end of the vehicle. These procedures were quite time consuming and required considerable manual labor. Also, one had to be careful that the prying and lifting did not damage the track.

The present invention is directed to overcoming one or more of the problems set forth above.

DISCLOSURE OF THE INVENTION

In one aspect of the invention, a track support for supporting a flexible oval track is provided. It has a first end means for receiving a first semi-circular end loop of the track, and second end means for receiving a second semi-circular end loop of the track with a brace means extending from the first end means to the second end means for supporting the first and second end means to maintain them in engagement with the flexible track.

The track support maintains the track in a configuration similar to the shape it has when it is on the vehicle. The track support comprises a first and second end supported by a beam extending between and attached to the ends. Each end has a curved plate approximately the shape of the semi-circular ends of the track loop which is formed by the circular shape of the track wheels on the vehicle.

The track support may be used for either removing or installing the track. When removing the track, the outer wheels of a pair of duals are removed and the track support inserted into the inside of the track loop. It is adjusted to the proper length so that the track is snugged on the curved plates of the first and second ends. Retainers are then installed which extend from the support to the opposite edge of the track in which manner the track is secured to the support. The track and support are then lifted by chains attached to the support and attached to some lifting means and the track is removed from the vehicle.

When installing the track, the support can be inserted in the track as it is laying on its edge on the ground. The above procedure is merely reversed and once the track is setting on the two inside wheels, the support is removed and the outer wheels of the sets of duals are installed.

BEST MODE FOR CARRYING OUT THE INVENTION

Figure 1:
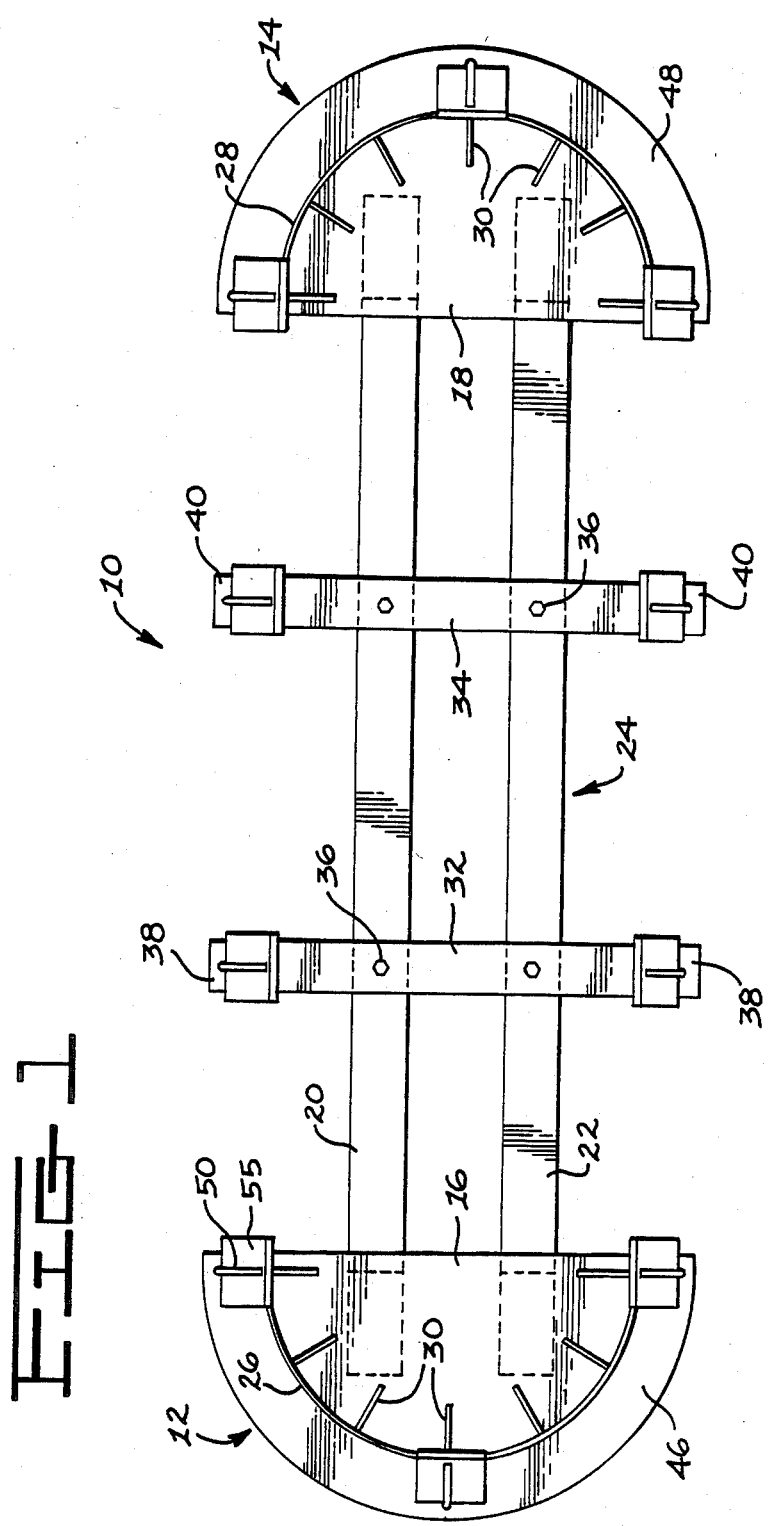
FIG. 1 is a side elevational view of the track support.

Referring now to the drawings, a track support 10 is shown having first and second ends 12 and 14. The ends have brackets or side walls 16 and 18 that are attached to beams 20 and 22 that provide a brace 24 that extends from the first to second ends 12 and 14 to support them. Curved plates 26 and 28 which are curved in an arc of a semi-circle are attached to the brackets 16 and 18. The plates 26 and 28 are further supported by gussets 30.

Between the first and second ends 12 and 14, brackets 32 and 34 are attached to the beams 20 and 22 by fasteners in the form of bolts 36. The brackets 32 and 34 extend beyond the beams 20 and 22 to bracket ends 38 and 40 that are located to engage a run 42 of a track loop 44 as can be seen in FIG. 2.

Figure 5:
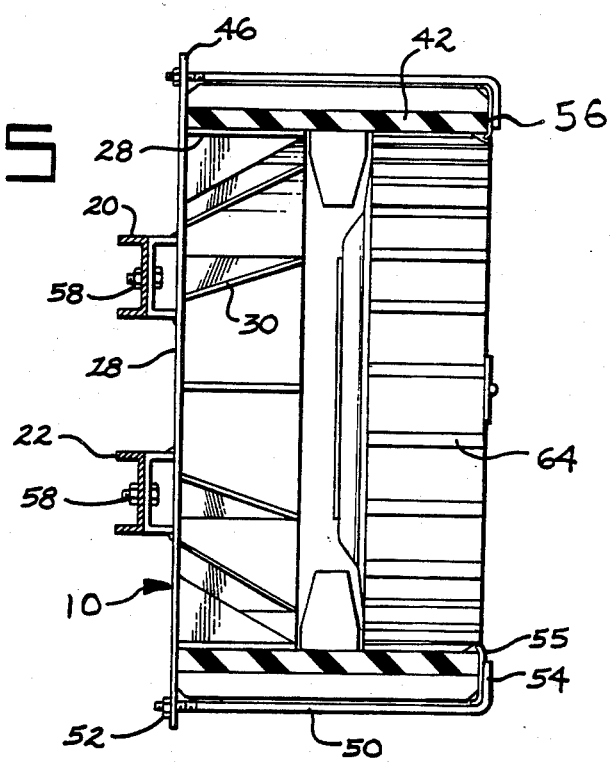
FIG. 5 is a view of the track support and track taken along plane V—V of FIG. 2.

The brackets 16 and 18, as shown by FIGS. 1 and 5, extend beyond the plates 26 and 28 a distance greater than the depth of the track section. In this manner walls 46 and 48 are formed where the curved plates 26 and 28 intersect at right angles to the brackets 16 and 18 to provide side wall surfaces for engaging the edge of the track.

As can best be seen from FIGS. 1 and 5, retainers 50 are attached to the side walls 46 and 48 of brackets 16 and 18 and bracket ends 38 and 40 by fasteners 52. They extend over the section of the track 42 and have integral hooks 54 that engage the edge 56 of the track 42. The hooks 54 have small plates 55 attached to them to provide a larger contact area between the hook and the track.

Figure 2:
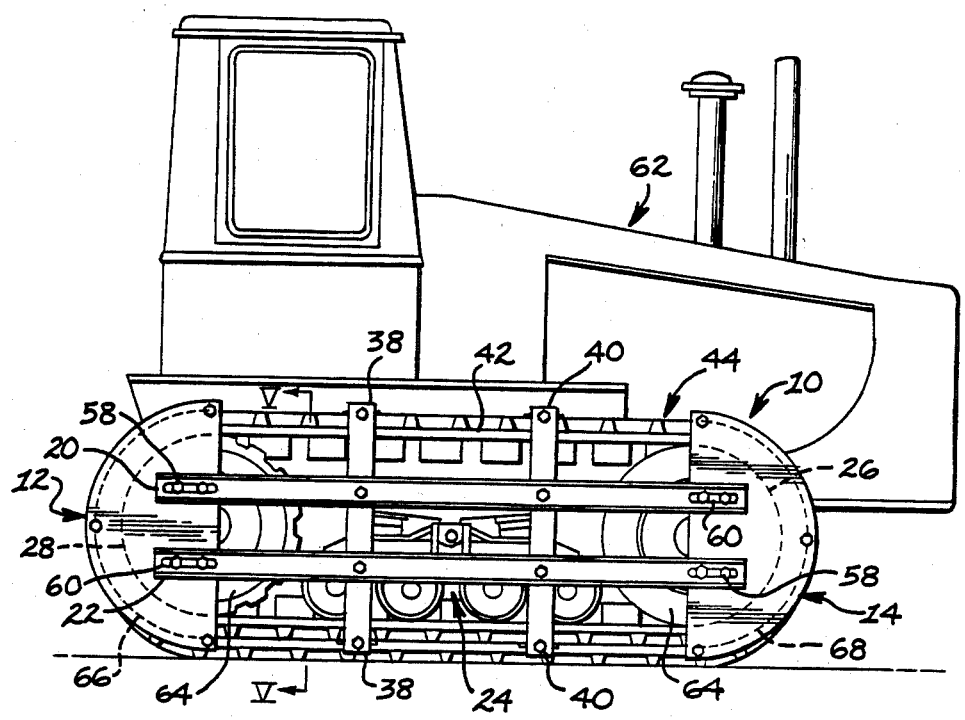
FIG. 2 is a side elevational view of a track-type vehicle with the track support inserted into the track of the vehicle.

As shown in FIG. 2, the first and second ends 12 and 14 are adjustably attached to the beams 20 and 22 by bolts or fasteners 58 and slots 60.

INDUSTRIAL APPLICABILITY

Figure 3:
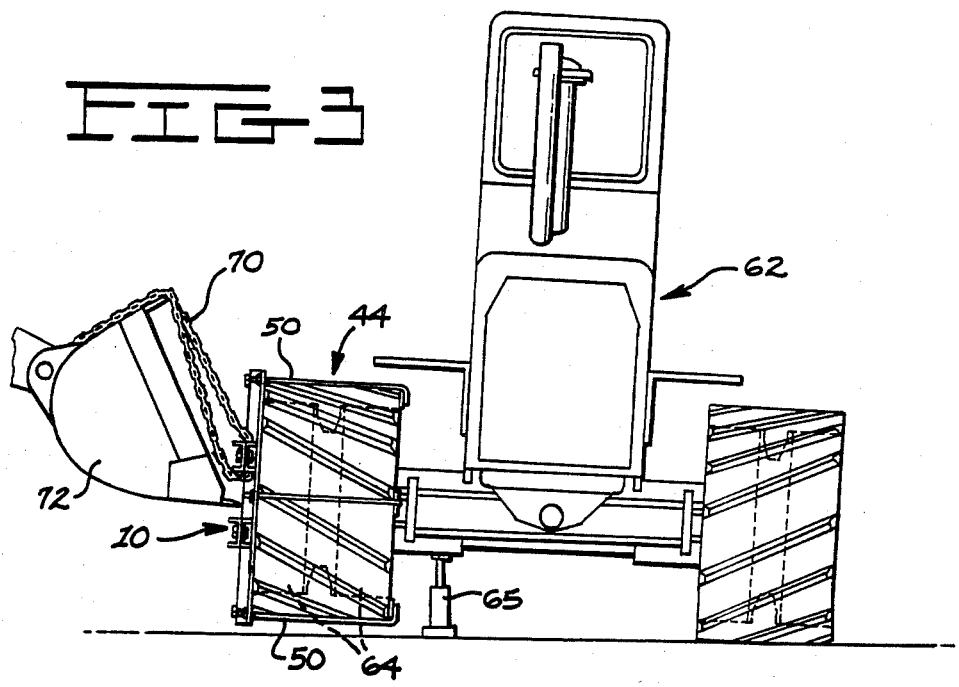
FIG. 3 is a front view as seen from the right of FIG. 2, showing the vehicle raised on a jack and the track support chained to a loader bucket.
Figure 4:
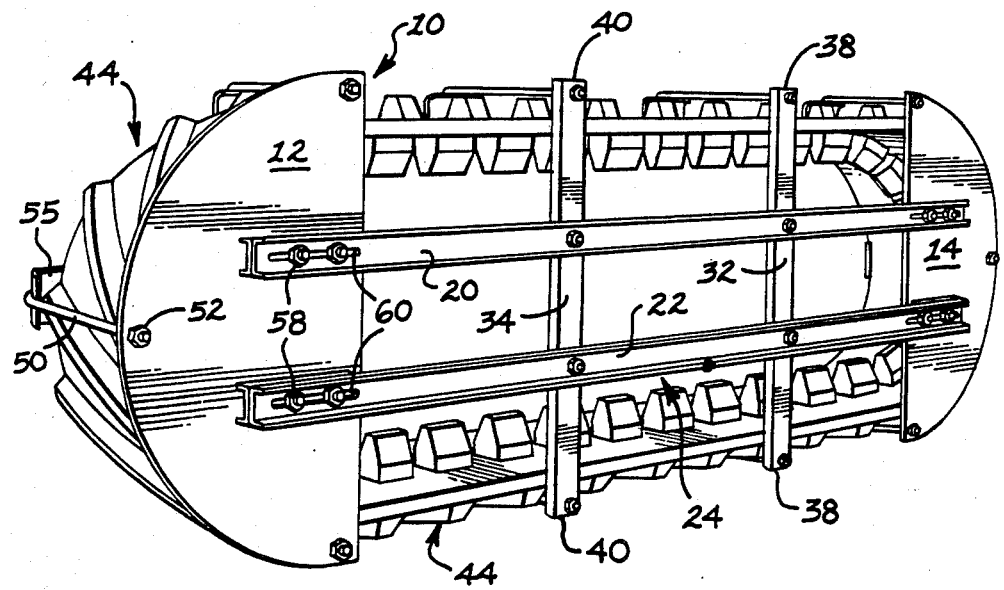
FIG. 4 is a perspective view of the track and track support off the vehicle.

The above-described apparatus is used to remove and install a flexible oval track 44 of a vehicle 62. The flexible track is trained over a set of dual wheels 64 located at each end of the vehicle. One side of the vehicle is raised by a jack 65 so that the track to be removed is lifted off the ground as shown in FIGS. 2 and 3. The outside wheels of the duals are removed and the track support 10 is inserted into the oval loop of the track as can be seen in FIG. 5. The first and second ends 12 and 14 are adjusted by loosening the fasteners 58 and moving them in their slots 60 bringing the curved plates 26 and 28 into snug contact with the semi-circular ends 66 and 68 of the track. As can be seen from FIGS. 2 and 5, the curved plates 26 and 28 have an arc substantially the same as the arc of the dual wheels 64 which form the semi-circular ends of the track loop 44.

The retainers 50 are installed with their hooks 54 engaging the edge 56 of the track as shown in FIG. 5. They are then tightened to the track 42 by their fasteners 52. This draws the track 42 to the side wall surfaces 46 and 48 and the bracket ends 38 and 40.

The track is then removed from the vehicle by a loader or some similar lifting device. A chain 70 is attached to the track support 10 and a loader bucket 72. The bucket is raised slightly and backed away from the vehicle 62 removing the track 44.

The track is installed by reversing the above procedure. If the track support 10 is not in the track when it is off the vehicle it can be installed by placing the track on its edge in the form of a loop. The track support is then inserted into and secured to the track after which it is lifted upright and installed on the vehicle.

The structural integrity of the track support holds and supports the flexible cable reinforced rubber track in the shape that it is used on the vehicle. The track support also provides a rigid means of handling the track reducing the potential of damage to the track from chains, cables, and other handling devices. It is also possible to use two track supports, one on each side of the track, to ship it from the factory to the field. The two supports would be tied together by tie bolts used in place of the retainers 50.

Other aspects, objects and advantages become apparent from study of the specification, drawings and appended claims.

I claim:

1. A track support for supporting a flexible oval track having first and second semi-circular end loops off of a vehicle, comprising:
    a first end means for receiving the first semi-circular end loop of the flexible track;
    a second end means for receiving the second semi-circular end loop of the flexible track;
    a third brace means extending from the first end means to the second end means for supporting the first and second end means and for maintaining them in engagement with the flexible track; and
    a fourth means for securing the flexible track to the first, second and third means.

2. The track support, as set forth in claim 1, wherein the first and second end means are comprised of brackets and curved plates attached perpendicularly thereto, the curved plates having an arc of substantially the same size as an arc of the semi-circular end loops and the brackets having walls extending beyond the curved plates.

3. The track support, as set forth in claim 1, wherein the brace means is comprised of at least one beam having first and second ends attached to the first and second end means to maintain them in engagement with the first and second semi-circular end loops of the flexible track.

4. The track support, as set forth in claim 1, wherein the fourth means is comprised of multiple retainers having hooks on one end in engagement with the flexible track and fasteners on the opposite ends securing the retainers to the first, second and third means, thereby securing the flexible track to the track support.

5. A track support for supporting a flexible oval track off of a vehicle, the flexible track having first and second semi-circular ends that engage wheels on both ends of a vehicle forming a continuous loop, comprising:
    a first end comprised of a first side wall and a first curved plate curved to approximately the shape of the first semi-circular end and attached to the first side wall substantially perpendicular;
    a second end comprised of a second side wall and a second curved plate curved approximately the shape of the second semi-circular end and attached to the second side wall substantially perpendicular;
    at least one beam attached to the first and second ends, the beam maintaining the first and second ends at a distance equal to the continuous loop of the flexible track whereby the flexible track is supported by the curved plates; and
    retainers comprised of hooks for engaging the flexible track and fasteners for securing the retainers to the first and second ends whereby the flexible track is held against the side walls and on the curved plates.

6. The track support, as set forth in claim 5, wherein there are adjustment means between the beam and the first and second ends.

7. The track support, as set forth in claim 5, wherein there are at least two beams between the first and second ends.

* * * * *